May 12, 1942.  O. W. GITHENS ET AL  2,282,863
MOTION PICTURE PROJECTOR
Original Filed June 3, 1937  2 Sheets-Sheet 1
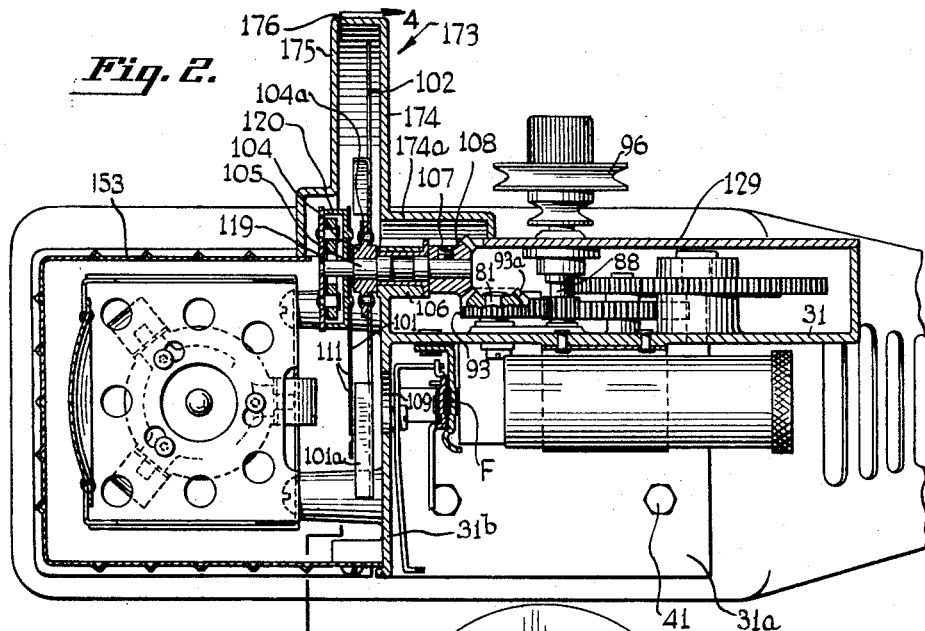
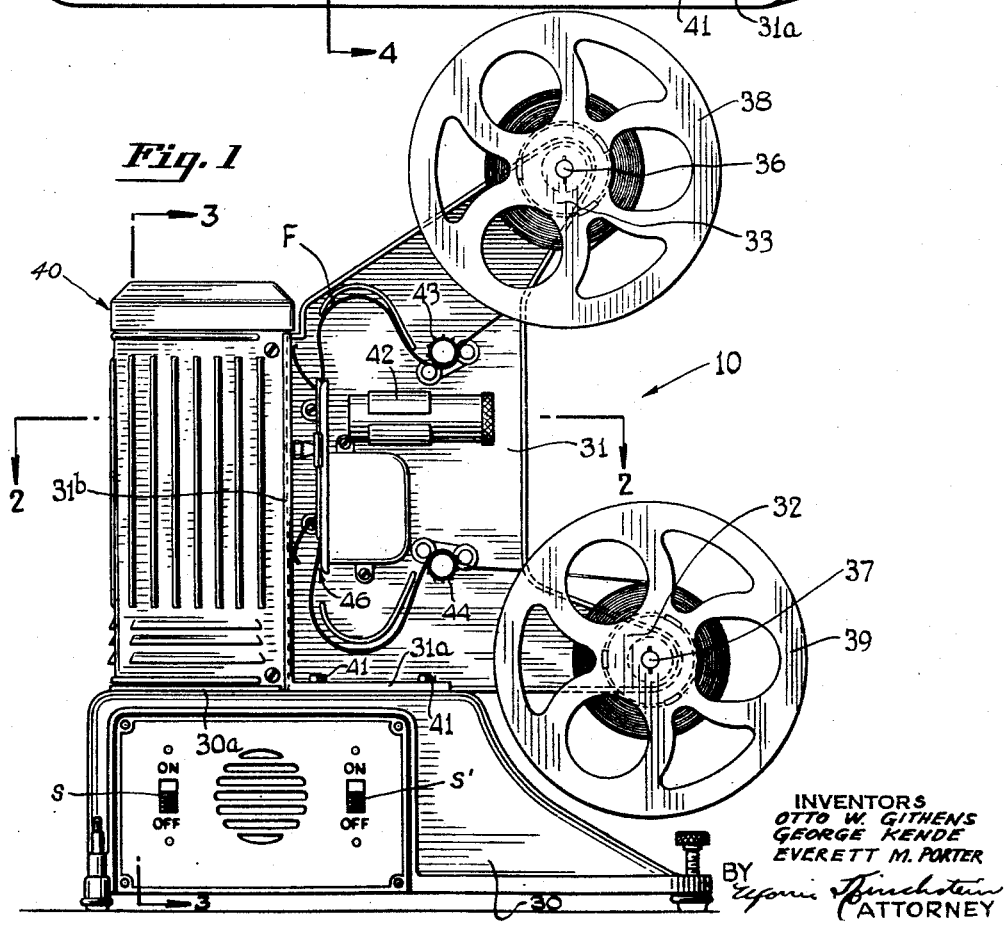
INVENTORS
OTTO W. GITHENS
GEORGE KENDE
EVERETT M. PORTER
BY
ATTORNEY May 12, 1942. O. W. GITHENS ET AL 2,282,863
MOTION PICTURE PROJECTOR
Original Filed June 3, 1937 2 Sheets-Sheet 2
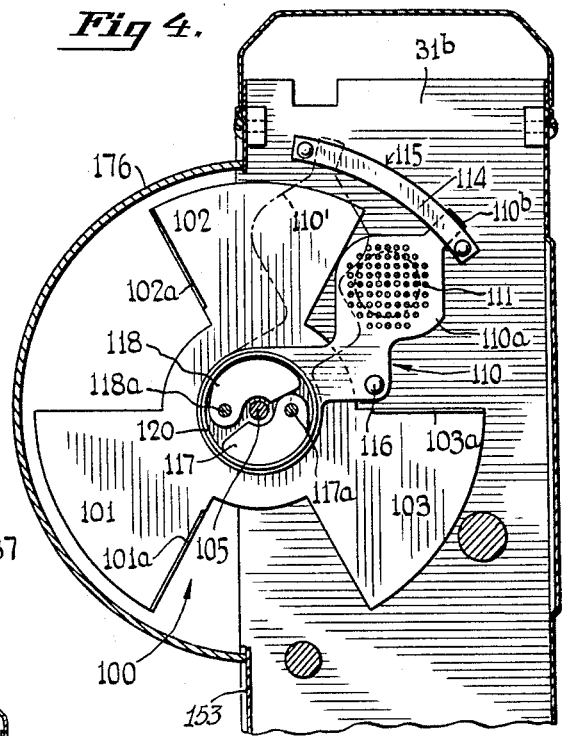
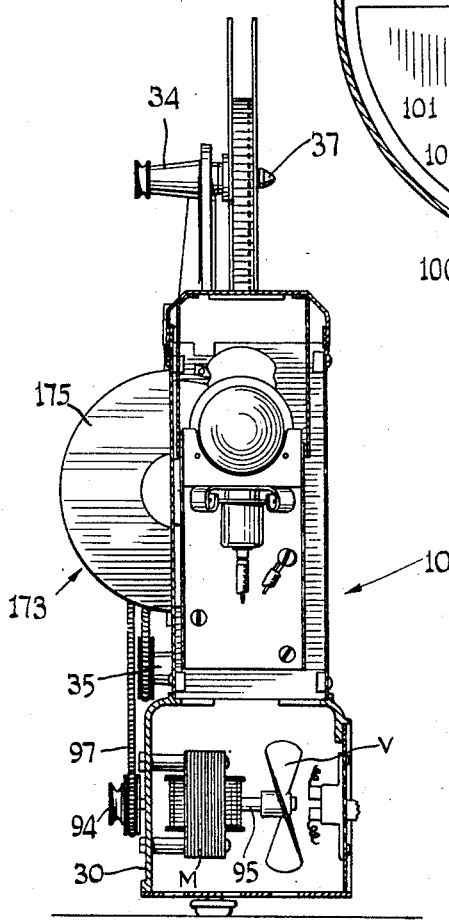
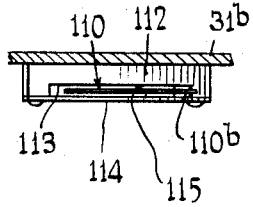
INVENTORS
OTTO W. GITHENS
GEORGE KENDE
EVERETT M. PORTER
BY
ATTORNEY

Patented May 12, 1942

2,282,863

UNITED STATES PATENT OFFICE 2,282,863

MOTION PICTURE PROJECTOR

Otto W. Githens and George Kende, New York, and Everett M. Porter, Brooklyn, N. Y., assignors to Universal Camera Corporation, New York, N. Y., a corporation of Delaware Original application June 3, 1937, Serial No. 146,182, now Patent No. 2,190,658, dated February 20, 1940. Divided and this application December 21, 1939, Serial No. 310,345

3 Claims. (Cl. 88—19.4)

This invention relates generally to motion picture projectors and has for one of its objects the provision of a motion picture projector having improved constructional features relating to the shutter and to an auxiliary fire shutter designed to prevent blistering or burning of the film, which features are further characterized by their simplicity and efficiency of operation.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

Certain features shown and described but not claimed in this application are shown, described and claimed in our copending application, Serial No. 146,182, filed June 3, 1937, which has become Patent No. 2,190,658, dated February 20, 1940, for Motion picture projectors, of which the present application is a division.

In the accompanying drawings, in which is shown one of the various possible embodiments of this invention, Fig. 1 is a side elevational view of a motion picture projector embodying our invention;

Fig. 2 is an enlarged cross-sectional view taken substantially on the line 2—2 of Fig. 1;

Fig. 3 is a cross-sectional view taken substantially on the line 3—3 of Fig. 1;

Fig. 4 is a cross-sectional view taken substantially on the line 4—4 of Fig. 2; and Fig. 5 is a cross-sectional view explanatory of the guiding means for the fire shutter.

Referring now in detail to the drawings and more particularly to Figs. 1 and 3, there is disclosed a projector 10 embodying our invention and comprising generally a base 30 which is adapted to house an electric motor M of usual construction, a pair of operation switches S and S', and a ventilating fan V, all of which are fully disclosed and described in said copending application Serial No. 146,182. As further described in our said copending application, there is attached to the top wall 30a of the base 30 a main supporting frame 31 substantially rectangular in shape and having integrally cast extensions or reel arms 32 and 33. The said reel arms 32 and 33 are provided with integrally cast bearing brackets 34 and 35 (see Fig. 3), into which there is journalled the shafts 36 and 37, which are designed to receive thereon for rotation therewith suitable take-off and take-up reels 38 and 39. The frame 31 is further provided with an integrally cast portion 31a which extends from the bottom edge of the said frame 31 at right angles thereto and is adapted to overlie the top wall 30a of the base 30. Integral with the frame 31 and with the portion 31a is a vertical wall 31b disposed at right angles to the portion 31a and also to the body of the frame 31. The wall 31b is so constructed and arranged as to serve as one side wall of the lamp house 40, in the manner shown and described in our said copending application. The portion 31a of the frame 31 may be fixed to the base 30 by any suitable attaching means such as, for example, a plurality of screws 41, passing through the frame portion 31a and received in the threaded holes in the top wall 30a of the base so that the frame 31 is held rigidly in upright position.

The frame 31 is so designed and constructed that in addition to supporting the reels 38 and 39, it is adapted to be used as a support for the intermittent film movement mechanism, film sprocket wheels 43 and 44, the lens holder support 42, the film passageway 46, a shutter 100 (soon to be described in detail), and a chain of gearing for synchronously driving the film movement and the shutter together with the sprocket wheels from a main shaft 88. The said main shaft 88 is journaled in the frame 31 and is adapted to be driven from the motor M by means of a pulley 94 fixed to the motor shaft 95 for rotation therewith, and a pulley 96 fixed to the main driving shaft 88 for rotation therewith, through an interconnecting belt 97.

Designed to operate in synchronism with the intermittent film advancing apparatus described in our said copending application, we have provided in accordance with our invention, a shutter device 100 which is clearly illustrated in Figs. 2 and 4 and which will now be described.

The shutter 100 is preferably of the annular three-blade type having the symmetrically arranged blades 101, 102 and 103, and is fixed to a collar 104 by the rivets 104a, said collar 104 being mounted on the shaft 105 for rotation therewith. The shaft 105 is journaled in a bracket 106 which is attached to a portion of the wall 31b extending beyond the frame 31 or which may be integral therewith, as shown. At one end of the shaft 105 there is fixed, by means of a set screw 107, a bevel gear 108 adapted to mesh with the beveled portion 93a of the combination gear 93, mounted on the shaft 81, which in turn is mounted on the frame 31. Attached to the main shaft 88 is a pinion 90 in mesh with the spur teeth of the combination gear 93. It is thus seen that when the main shaft 88 is driven from the motor M in the manner above described, the shaft 105 will be caused to rotate. The shutter 100 is designed to synchronously cover and uncover a light aperture 109 in the wall 31b, said aperture being in alignment with the apertures in the film passageway 46 and in optical alignment with the light source contained in the lamp house 40. The three-blade shutter 100, operating in synchronism with the film movement mechanism, is so designed that the film F is caused to be pulled down from one frame to the next in less time than it takes for one-sixth of a revolution of the shutter 100, thereby giving complete coverage of the aperture 109 by the shutter 100 during the period that the film is being pulled down. The three-blade shutter 100 is designed to provide approximately 48 alterations or complete cycles from dark to light per second, which will give pleasing results to the eye for the projector built in accordance with our invention, and designed to operate at a film speed of 16 frames per second. Each of the blades 101, 102 and 103 of the shutter 100 is provided with bent-up ears 101a, 102a and 103 which are disposed at an angle to the flat surface of the shutter so as to set up convection currents of air in the lamp house 40 to thereby aid in the cooling of the same.

To enable the projector designed in accordance with our invention to be used for the showing of still pictures as well as motion pictures, there is provided an automatically operated fire shutter 110 (see Figs. 2, 4 and 5) adapted to be interposed between the source of light in the lamp house 40 and the aperture 109 and designed to normally rest in such position whenever the said aperture is in constant open communication with said light source through any one of the spaces between the shutter blades 101, 102 and 103 or in other words, when the shutter 100 is not rotating. The fire shutter 110 is freely rotatably mounted on the shutter shaft 105 adjacent one end thereof and is provided with an integral radially extending offset portion 110a adapted to normally rest in such position and is of sufficient size as to cover the aperture 109. The portion 110a is provided with a plurality of closely spaced perforations 111, through which sufficient light is adapted to pass in order to clearly project the picture from the film. By this construction the film is normally shielded from the full force of the light and heat from the light source when the shutter is not rotating and may be kept standing in such position for about 30 to 40 seconds while individual pictures are shown, without burning, blistering or in any other way damaging the film.

The fire shutter 110 is adapted to normally assume the effective position described, with the portion 110a covering the aperture 109, by reason of its own weight or, if desired, a counterweight 116 may be fixed to the fire shutter 110, as shown, to normally maintain the same in the position as shown in Fig. 4. Means are provided whereby upon rotation of the shaft 105 to operate the shutter 100 for the purpose of projecting motion pictures, the fire shutter 110 will be automatically moved out of its full-line normal resting position, as shown in Fig. 4, to the dotted-line position 110' to uncover the aperture 109. This is accomplished by means of a pair of symmetrically disposed and pivotally mounted weight members 117 and 118 freely rotatably mounted on the pivots 117a and 118a, respectively, said pivots being in turn fixed to a disk member 119 which is fixed to the end of the shaft 105 for rotation therewith. The members 117 and 118 are designed to be received in a drum 120 fixed to the fire shutter 110 for integral movement therewith. It is thus seen that when the shaft 105 is rotated at a predetermined speed, the members or weights 117 and 118, due to the action of the centrifugal force generated, will swing outwardly to frictionally engage the inner wall of the drum 120 and thus cause rotation of said drum with the shaft 105, said drum, in turn, carrying the fire shutter from the full-line position 110 to the dotted-line position 110' shown in Fig. 4. When the speed of rotation of the shaft 105 is diminished or when the said shaft 105 comes to rest, the weights 117 and 118 will assume their normal position, out of contact with the inner wall of the drum 120 to thereby permit the fire shutter 110 to fall back to its original position covering the aperture 109 by the action of gravity due to its own weight or under the influence of the additional weight 116.

As shown in Figs. 4 and 5, the fire shutter 110 is designed to travel in a guided path by means of an arcuate-shaped lug 112 fixed to the wall 31b, and provided with a notched portion 113, said notch 113 being covered with a plate 114 to define a slotted pathway 115 in which an extension 110b of the fire shutter portion 110a is adapted to travel. The pathway 115 is of predetermined size to limit the amount of rotational movement of the fire shutter 110. One end of the pathway 115 is so disposed that the shutter 110 will be positioned, as shown in Fig. 4 with the perforations 111 covering the aperture 109, while the opposite end of the pathway 115 serves to limit the amount of rotational movement of the fire shutter 110 away from the aperture 109.

A portion of the free longitudinal edge of the casing side 153 of the lamp house 40 may be notched to provide clearance for the operation of the rotating shutter 110, a portion of which is disposed within the lamp house 40 and a portion of which is disposed outside of said lamp house.

To hide from view the portions of the rotating shutter 110 which partially extend beyond the lamp housing and at the same time to prevent said rotating shutter from drawing dust particles into the lamp house, there is provided a shutter housing 173 which is designed to completely enclose the projecting portion of the shutter 110 and which comprises a pair of substantially semi-circular walls parallel to each other, such walls 174 and 175 being interconnected by an arcuate wall 176 adapted to permit the shutter 100 to freely rotate therein. A portion of the wall 175 is adapted to abut the side 153 of the lamp house 40 while a flange portion 174a of the wall 174 is adapted to be attached to the cover 129 of the gear housing, said last named portion being designed to cover the slightly projecting bevel gear 108.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a motion picture projector of the character described, the combination of a lamp house, a lamp in said lamp house adapted to project a beam of light, a shaft, a shutter fixed to said shaft for rotation therewith, said shutter being adapted to rotate across the path of said beam of light, means to rotate said shaft, a fire shutter comprising a lever freely pivotally mounted on said shaft and having a portion thereof normally disposed in the path of said light beam, and means for causing said fire shutter to automatically move from its normally disposed position to a position out of the path of said light beam during the rotational movement of said shaft, said last named means comprising a disc fixed to said shaft for rotation therewith, a drum fixed to said shutter for movement therewith, and a pair of opposed pivotally mounted members carried by said disc and adapted upon rotation of said shaft to frictionally contact the side wall of said drum.

2. In a motion picture projector of the character described, the combination of a lamp house, a lamp in said lamp house adapted to project a beam of light, a shaft, a shutter fixed to said shaft for rotation therewith, said shutter being adapted to rotate across the path of said beam of light, means to rotate said shaft, a fire shutter comprising a lever freely pivotally mounted on said shaft and having a portion thereof normally disposed in the path of said light beam, means for causing said fire shutter to automatically move from its normally disposed position to a position out of the path of said light beam during the rotational movement of said shaft, a member attached to the outer end of said fire shutter, and a guideway supported by said lamp house, said guideway and said member cooperating to guide the path of movement of said fire shutter and to limit the movement of said shutter by abutment of said member with the ends of said guideway.

3. In a motion picture projector of the character described, a combination of a lamp house, a lamp in said lamp house adapted to project a beam of light, a shaft, a shutter fixed to said shaft for rotation therewith, said shutter being adapted to rotate across the path of said beam of light, means to rotate said shaft, a fire shutter comprising a lever freely pivotally mounted on said shaft and having a portion thereof normally disposed in the path of said light beam, means for causing said fire shutter to automatically move from its normally disposed position to a position out of the path of said light beam during the rotational movement of said shaft, an extension on said fire shutter, and a member supported by said lamp house, said member having a slotted pathway in which said extension is slidingly received.

OTTO W. GITHENS.
GEORGE KENDE.
EVERETT M. PORTER.